Patented Dec. 13, 1932

1,890,860

UNITED STATES PATENT OFFICE

ALLEN L. OMOHUNDRO, OF DETROIT, MICHIGAN, ASSIGNOR TO FREDERICK STEARNS & COMPANY, OF DETROIT, MICHIGAN, A CORPORATION OF MICHIGAN

THERAPEUTIC AGENT

No Drawing.   Application filed March 22, 1930. Serial No. 438,242.

The invention relates to therapeutic agents useful for local application and more particularly to products adapted for the treatment of the mucous membranes of the nose, mouth and the respiratory system.

One of the objects of my invention is to obtain an improved product having enhanced therapeutic action, higher penetrability, and lower degree of unpleasant reaction on the patient.

Another object is to produce a therapeutic agent of great value in the medical treatment of various abnormal, subnormal and pathological conditions of the mucous membranes.

A further object is to obtain a therapeutic agent for treating mucous membranes of the nose, mouth and respiratory system having a higher therapeutic efficiency and potency than other products heretofore produced.

I have discovered that the above and other objects may be obtained by producing a therapeutic agent in which an active substance, chemical, or drug, useful for its vaso-constrictive properties is incorporated into a liquid in liquid emulsion having certain predetermined physio-chemical properties, which render the same particularly desirable.

My invention contemplates a product comprising a finely dispersed emulsion containing the active medicinal agent in which emulsion, the internal and external physio-chemical forces are so balanced as to maintain a stable condition exhibiting vastly different and more effective properties than other solutions or physical relationships of the same medicinal agent. One of the characteristics of the substances covered by my invention is the penetrability of the composition into the treated tissue or membrane. Another characteristic is the low surface tension of the dispersion phase of the emulsion and the low interfacial tension between this phase and the membrane treated. A further desirable characteristic is the freedom from unpleasant reaction when my improved therapeutic agents are applied to mucous membrane, particularly the absence of sting or other pain and also the freedom from distortion, distention or irritation of the membrane to which the new products are applied.

My invention may be embodied in therapeutic agents consisting of liquid in liquid emulsions in which is incorporated a vaso-constrictive substance such, for example, as may be comprised within the class of substances including epinephrine, ephedrine, synephrin and compounds of the same. Such substances have heretofore been known as possessing properties useful in the treatment of mucous membrane in the nose, mouth and the respiratory system but I have discovered that an unexpectedly great increase of therapeutic efficiency and potency is obtained by the incorporation of said substances in an emulsion having the physio-chemical properties hereinafter more fully described.

The term synephrin mentioned above is intended to include compounds such as the monooxy-aminoacetophenone derivatives, p-methylaminoethanolphenol hydrochloride, and other analogous compounds having vaso-constrictive properties.

My invention in its broader aspects includes emulsions in which the active medical agent may be an astringent, antiseptic, germicide or an anæsthetic providing the product possesses the physio-chemical properties hereinafter set forth. Thus, in accordance with the broader aspects of my invention, active medical agent is not necessarily included within the classification of vaso-constrictive substances hereinbefore mentioned.

In the practical application of my invention, it is preferable that the therapeutic agent be either an oil-in-water emulsion or a water-in-oil emulsion. As an example of the first mentioned type of emulsions the product contains water, an emulsifying agent, oil and a medicinal substance, preferably including also glycerin. The emulsifying agent may be gum acacia, albumen or other proteins, etc. The oil may be vegetable, animal or mineral in different instances and the hydrogen ion concentration (pH) can be adjusted within a wide range depending upon the type of emulsion desired. In the case of a water-in-oil emulsion this may be produced from the same materials listed above with the exception that the emulsifying agent can not include acacia or other substances rendering the surface tension of the water phase low but in its place there must be materials which will decrease the surface tension of the oil and so enclose droplets of water in an oil envelop.

My invention has a wide range of applicability and many therapeutic agents are comprised within its scope. By way of example I am giving below several methods of preparing products coming within the purview of my invention:

*Example 1.*—An oil-in-water emulsion may be made by using 3½ grams of acacia or other suitable emulsifying agent, 2 cc. of glycerin, 12 cc. of corn oil or other suitable oil. These substances are ground thoroughly until a snow-white homogeneous paste is produced to which is added 25 cc. of distilled water treated to obtain a pH of 7.5 at 25° C. The grinding of the mixture is continued until a perfectly white emulsion is obtained miscible with water in all proportions. This paste is preferably processed through a colloid mill or put through other apparatus to render the emulsion stable and homogeneous. The medicinal agent may be incorporated by dissolving the same in 25 cc. of water.

*Example 2.*—A therapeutic agent useful in the treatment of mucous membrances of the nose, mouth and respiratory system may be prepared as follows: To 10 grams of finely powdered acacia there is added 43 cc. of corn oil and the whole mass ground thoroughly in a colloidal mill. When a thorough mixture has been produced 25 cc. of distilled water is added and the grinding continued until a perfectly homogeneous snow-white pasty emulsion is obtained. Following this process there is added 30 more cc. of distilled water at 40° C. which produces a fluid snow-white emulsion having the appearance of milk. After this dilute emulsion is thoroughly homogeneous the volume is increased to a total of 200 cc. by adding distilled water containing 6 grams of p-methylaminoethanolphenol hydrochloride. The entire mass is then removed from the colloidal mill and filtered through cotton. The resulting product is a therapeutic agent of great utility in the treatment of mucous membranes of the nose, mouth and the respiratory system.

*Example 3.*—Another therapeutic agent may be prepared by treating 10 grams of acacia with 45 cc. of cottonseed oil in a colloidal mill in the same manner as outlined above in Example 2. After obtaining a thorough mixture there is added 35 cc. of water carrying mercurochrome in solution and the entire mass then ground in the colloidal mill until a homogeneous emulsion is obtained.

*Example 4.*—The following procedure may be utilized to obtain a highly efficient therapeutic agent. 0.5 of a gram Irish moss is washed in cold water and 60 cc. of hot water added and allowed to stand for about 12 hours. After straining the mucilage is heated to about 45° C. and 2.6 grams powdered acacia and 0.3 grams powdered tragacanth is added. Another solution is made by dissolving 0.9 grams agar agar in 45 cc. boiling water, the mixture being strained while hot. This liquid is mixed with the first mentioned preparation and processed through a colloidal mill while adding very slowly 70 cc. of a mineral oil such as Kydol, or other suitable oil. The colloidal mill should be run preferably for at least 2 hours and then there is added 13 cc. of glycerin and later an additional amount of distilled water until the total volume is about 250 cc.

The emulsion formed as above has incorporated therein the desired medicinal agent such, for example, as (*a*) synephrin,
(*b*) epinephrine,
(*c*) ephedrine.

The product containing synephrin is preferably prepared by adding enough highly concentrated synephrin solution so that there will be about 2½% by-weight of synephrin in the final emulsified product. The ephedrine emulsion is preferably made by incorporating sufficient ephedrine solution to obtain an emulsion containing ½ of 1% or more ephedrine. In the case of the epinephrine emulsion the proportion of epinephrine is desirably kept to approximately .1%.

In the preparations as described above, I have obtained therapeutic agents which are far superior to any heretofore produced and having increased therapeutic efficiency and potency. The surface tension of the emulsions is preferably between 50 to 55 dynes per centimeter. The optimum surface tension is 51 dynes per centimeter as compared with pure water which has a surface tension of approximately 72 dynes per centimeter at the same temperature. By reason of the physio-chemical properties of the emulsion the active medicinal substance is spread or concentrated in the film of the dispersion medium and for this reason the mucous membranes can be covered with a film of the highly active phase of the system having a low interfacial tension, low viscosity and high permeability capable of very intimate physical contact with mucous surfaces to which it is applied and of distributing itself rapidly and completely over surfaces of relatively large area. Thus the membrane is completely covered with a film of the emulsion and it can readily absorb the active substance. By having the materials in a physical system approaching the colloidal state the activity of the medicament, in effect, is enhanced. Furthermore, all irritation of the tissues is avoided and the penetration of the fluid into the smallest crevices is accomplished.

Where the emulsion is an oil-in-water emulsion there is an additional beneficial physiological characteristic in that the dispersed oil on the membrane shows a tendency to form a film over the membrane and over the active solution in contact with the membrane, thereby soothing the membrane and reducing irritation.

The new therapeutic agents encompassed by my invention do not cause distortion, distention, irritation or sting when applied to aqueous mucous membrane. This is of great therapeutic value and renders my improved products vastly superior to other preparations of a vaso-constrictive type which have heretofore been available to the medical profession.

It is desirable that products made in accordance with my invention should have a certain amount of preservative incorporated therein before being utilized commercially. While the particular preservative employed may vary in different instances, very satisfactory results may be obtained by employing up to ½ of 1% sodium benzoate.

What I claim as my invention is:

1. A composition for application to mucous membranes of the nose, mouth and the respiratory system comprising a liquid in liquid emulsion, one of said liquids being oil and the other of said liquids being water, and a therapeutic substance having vaso-constrictive action dissolved in one of the phases of said emulsion, said composition having a low interfacial tension between the dispersion phase of said emulsion and aqueous mucous membrane and said composition being characterized by its freedom from unpleasant reaction when applied to aqueous mucous membrane.

2. A composition for application to mucous membranes of the nose, mouth and the respiratory system comprising a liquid in liquid emulsion and a substance dissolved in one of the phases of said emulsion having vaso-constrictive action and comprised within the class of substances including epinephrine, ephedrine, synephrin and compounds thereof.

3. A composition for application to mucous membranes of the nose, mouth and the respiratory system comprising an oil-in-water emulsion having a low interfacial tension between the water phase and aqueous mucous membrane and a substance dissolved in said water phase comprised within the class of substances including epinephrine, ephedrine, synephrin and compounds thereof, said composition being characterized by high penetrability on mucous membrane, efficient application of the substance to the membrane and a soothing action.

4. A composition for application to mucous membranes of the nose, mouth and the respiratory system comprising oil, water, an emulsifying agent and approximately 2½% by-weight of synephrin, said constituents being incorporated into a permanent emulsion having the following physiological properties when applied to mucous membrane, high penetrability, low interfacial tension between the dispersion phase of said emulsion and aqueous mucous membrane and freedom from unpleasant reaction.

In testimony whereof I affix my signature.

ALLEN L. OMOHUNDRO.

DISCLAIMER 1,890,860.—*Allen L. Omohundro*, Detroit, Mich. THERAPEUTIC AGENT. Patent dated December 13, 1932. Disclaimer filed May 20, 1937, by the assignee, *Frederick Stearns & Company*.

Hereby enters this disclaimer to claims 1 and 2 in their entirety.

[*Official Gazette June 15, 1937.*]